United States Patent
Uhm et al.

(10) Patent No.: US 9,518,138 B2
(45) Date of Patent: Dec. 13, 2016

(54) COPOLYMER OF ETHYLENE AND ALPHA-OLEFIN, AND METHOD FOR PREPARING SAME

(71) Applicant: DAELIM INDUSTRIAL CO., LTD., Seoul (KR)

(72) Inventors: Jae Hoon Uhm, Daejeon (KR); Sang-Deok Mun, Daejeon (KR); Jin-Hun Ju, Daejeon (KR); Hee-Sun Bae, Daejeon (KR); Sah-Mun Hong, Daejeon (KR); Byung-Keel Sohn, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 14/441,570

(22) PCT Filed: Nov. 15, 2013

(86) PCT No.: PCT/KR2013/010392
§ 371 (c)(1),
(2) Date: May 8, 2015

(87) PCT Pub. No.: WO2014/077617
PCT Pub. Date: May 22, 2014

(65) Prior Publication Data
US 2015/0266985 A1 Sep. 24, 2015

(30) Foreign Application Priority Data
Nov. 19, 2012 (KR) .......................... 10-2012-0130792

(51) Int. Cl.
| | | |
|---|---|---|
| *C10M 107/00* | (2006.01) | |
| *C10M 107/04* | (2006.01) | |
| *C10M 107/06* | (2006.01) | |
| *C10M 107/10* | (2006.01) | |
| *C08F 4/6592* | (2006.01) | |
| *C08F 4/643* | (2006.01) | |
| *C08F 210/16* | (2006.01) | |
| *C08F 4/659* | (2006.01) | |

(52) U.S. Cl.
CPC .......... *C08F 210/16* (2013.01); *C10M 107/06* (2013.01); *C08F 4/65908* (2013.01); *C08F 4/65912* (2013.01); *C10M 107/04* (2013.01); *C10M 107/10* (2013.01)

(58) Field of Classification Search
CPC .............. C08F 4/65927; C08F 4/65908; C08F 4/65912; C08F 210/02; C08F 210/06; C10M 107/00; C10M 107/04; C10M 107/06; C10M 107/10
See application file for complete search history.

(56) References Cited

U.S. PATENT DOCUMENTS

| | | | |
|---|---|---|---|
| 5,675,049 A * | 10/1997 | Vermeiren | ............ C08F 210/16 585/511 |
| 6,417,416 B1 | 7/2002 | Heilman et al. | |
| 7,619,047 B2 | 11/2009 | Yang et al. | |
| 8,058,368 B1 | 11/2011 | Kang et al. | |
| 8,128,878 B2 | 3/2012 | Kang et al. | |
| 2006/0116303 A1 | 6/2006 | Iimura et al. | |
| 2008/0171651 A1 | 7/2008 | Tohi et al. | |
| 2009/0043057 A1* | 2/2009 | Funaya | .................. C07F 17/00 526/126 |
| 2010/0273692 A1* | 10/2010 | Kolb | ..................... C08F 210/06 508/591 |
| 2015/0017365 A1 | 1/2015 | Sohn et al. | |

FOREIGN PATENT DOCUMENTS

| | | |
|---|---|---|
| CN | 101389668 A | 3/2008 |
| EP | 0060609 A1 | 9/1982 |
| JP | 57117595 A | 7/1982 |
| JP | 61221207 A | 10/1986 |
| JP | 01163136 A | 6/1989 |
| JP | 07121969 A | 5/1995 |
| JP | 2796376 B2 | 9/1998 |
| KR | 1020040062422 A | 7/2004 |
| KR | 1020060029274 A | 4/2006 |
| KR | 1020080100439 A | 11/2008 |
| KR | 1020090035000 A | 4/2009 |
| WO | 2007/101053 A1 | 9/2007 |

OTHER PUBLICATIONS

International Search Report dated May 19, 2015 corresponding to application No. PCT/KR2013/010392.

* cited by examiner

*Primary Examiner* — Caixia Lu
(74) *Attorney, Agent, or Firm* — Nath, Goldberg & Meyer; Jerald L. Meyer; Tanya E. Harkins

(57) ABSTRACT

A liquid random copolymer of ethylene and alpha-olefin prepared by using specific metallocene catalyst and ionic compound and a method for preparing the same are disclosed. The liquid random copolymer has high viscosity index and shear stability so that it is useful as synthetic lubricants. The liquid random copolymer of ethylene and alpha-olefin (1) comprises 60 to 40 mol % of ethylene units and 40 to 60 mol % of alpha-olefin unit having 3 to 20 carbon atoms, (2) has number average molecular weight (Mn) of 500 to 10,000 and a molecular weight distribution (Mw/Mn, Mw is the weight average molecular weight) of 3 or less measured by Gel Permeation Chromatography (GPC) (3) has Kinematic Viscosity at 100° C. of 30 to 5,000, (4) has pour point of 30 to −45° C., and (5) has Bromine Number of 0.1 or less.

6 Claims, No Drawings

COPOLYMER OF ETHYLENE AND ALPHA-OLEFIN, AND METHOD FOR PREPARING SAME

FIELD OF THE INVENTION

This invention relates to an ethylene and alpha-olefin copolymer and method for preparing the same, and more particularly to a liquid random copolymer of ethylene and alpha-olefin which is useful as synthetic lubricating oils having high viscosity index and shear stability, and a method for preparing the same.

BACKGROUNDS OF THE INVENTION

Generally, lubricating oils includes base oils and additives for improving the physical properties of the base oils, and the base oils are typically classified to mineral oils and synthetic oils. As the importance of energy efficiency and environmental pollution is recently emphasized, a demand for sustainable oils, that is being able to be used long-term, has increased. Therefore, industrial field has been increasingly demanded, synthetic oils having excellent properties such as low-temperature fluidity, thermal and oxidative stability, low evaporation losses at high temperatures, high viscosity index, durability on friction, hydrolytic stability, resistance to corrosion, in place of mineral oils. Also, with the regulation of energy efficiency and environmental protection being reinforced, the synthetic lubricating oils are increasingly used in the fields of vehicles and aircrafts.

In vehicle fields, the lubricating oils are used as engine oils, brake oils or lubricating greases, and specifically the engine oils are used as 2-stroke oils, 4-stroke oils or gear oils. In aircrafts fields, the lubricating oils are used as turbine oil, piston engine oils, hydraulic fluids, lubricating greases. While in other industrial fields, the lubricating oils are used as turbine oils, gear oils, bearing and circulation oils, compressor oils, hydraulic oils, metal working fluids, the thermal shearing and insulating oil or lubricating grease. The lubricating oils require various properties depending on the respective purposes. Recently, in accordance with the high performance and high output of an internal combustion engine, are required the lubricating oils having excellent properties such as wear resistance of the internal combustion engine components, heat resistance, sludge resistance, lubricant consumption characteristics or fuel efficiency. Specifically, in order to improve the durability of the internal combustion engine. It is necessary to prevent the lubricating oil reduction and the viscosity decrease of the lubricating oil by shearing of the lubricating oils. Also, in order to improve fuel efficiency, it is necessary to increase the low-temperature viscosity of the lubricating oils. Accordingly, the lubricating oils of long-life, that is, low-evaporation and low-temperature viscosity is required in grease lubricating oils, engine oils, gear oils or hydraulic oils etc.

The synthetic lubricating oil mainly used as an automotive gear oil or engine oil, industrial lubricating oil or hydraulic oil etc, is poly-α-olefin (PAO) (See: U.S. Pat. No. 3,780,128, U.S. Pat. No. 4,032,591, Japanese Unexamined-Publication H1-163136 etc). The POA can be obtained by oligomerization of higher alphaolefin, under an acid catalyst, however, it has a drawback that raw materials of linear alpha-olefin (LAO) is expensive. On the other hands, Japanese Unexamined-Publication 1982-117595 discloses a preparing method for synthetic lubricating oils by copolymerizing the ethylene and alpha-olefin, the synthetic lubricating oils having excellent properties in view of viscosity index, oxidation stability, shear stability, heat resistance etc. In the copolymerization of ethylene and alpha-olefin, is used a catalyst composition composed by titanium compound and organic aluminum compound, generally known as the 1st generation catalyst. The titanium compound catalyst has large catalystic activity, but molecular weight of the copolymer obtained has wide range and low Irregularities. Accordingly, it is difficult to obtain high flash point products which are useful for lubricating oils, lubricating oil additives, fuel oil additives etc, and in case of high viscosity products, cost thereof is high so that it is not practical. Also, U.S. Pat. No. 5,767,331 discloses a method for copolymerizing the ethylene and alpha-olefin, specifically copolymerizing ethylene and propylene, by using vanadium-based catalyst composition containing vanadium compound and organic aluminum compound. The copolymer prepared by using vanadium-based catalyst composition has narrow molecular weight distribution and superior uniformity. But the copolymer prepared by using vanadium-based catalyst composition generally has very low polymerization activity, and accompanies large amount of catalyst sludge so that it has a drawback of requiring the additional de-catalytic process, which is common problem on the 1st generation catalyst such as Ziegler-Natta catalyst. In addition, Japanese Unexamined-Publication S61-221207, Japanese Unexamined-Publication H7-121969 etc. disclose a method for preparing the copolymer with high polymerization activity by using a catalyst system composed by metallocene compound such as zirconocene and so on and organoaluminum oxy-compound, and Japanese Patent 2796376 discloses a method for preparing synthetic lubricating oils by copolymerizing the ethylene and alpha-olefin, by using a catalyst system composed by specific metallocene catalyst and organoaluminum oxy-compound.

In order to overcome the disadvantages of the 1st generation catalyst such as a Ziegler-Natta catalyst, the use of bis-indenyl metallocene catalyst has been attempted. The bis-indenyl metallocene catalyst forms composition of more homogeneous (pseudo random) chain structure. However, it is difficult to prepare pure racemic bis-indenyl catalyst, so that not only its preparing cost is high but also, if the pure catalyst is obtained, it cannot be avoided for part of the catalyst to be switched to the meso-derivatives. Also, in case of the catalyst, since the steric hindrance increases in metal center after the 2,1-insertion, there is a problem of decreasing the molecular weight of the produced polymer. The catalyst increases only ethylene reactivity, and the random copolymer produced by using the catalyst contains an unsaturated double bond, to lower the thermal stability and durability of the synthetic lubricating oils. Accordingly, when the catalyst is used there is a drawback that a process of hydrogen addition using hydrogen should be additionally carried out for removing the unsaturated double bonds. Also, Literature of Angew. Chem. Int. Ed. 1998, Vol. 37, No. 7, p 922-925 (Leclerc and Waymouth) discloses a method for copolymerizing ethylene and propylene using metallocene compound having cyclopentadiene (Cp) ligand and fluorene (Flu) ligand. Particularly, the Literature discloses zirconium metallocene catalyst containing unsubstituted Cp, 3-methyl Cp, 3-tert-butyl Cp and 3,4-dimethyl Cp ligands, however, the catalyst is only partially useful for the preparation of quasi-random polymers, and there is significant degree of randomization in the polymers produced by the catalyst.

Like the above, the metallocene catalysts are known to be useful in a variety of polymerization processes, however, up to now, a preparation method of olefin copolymer having superior random degree of ethylene and propylene being equally alternately reacting, has not been known. Therefore, the improved process for the preparation of a random olefin copolymer has been desired. Further, recently considering environmental issues, fuel consumption, energy saving, etc., the demand is increased for synthetic lubricating oils of PAO or ethylene/propylene copolymer having superior durability, low-temperature viscosity (viscosity index) characteristic, heat and oxidation stability.

SUMMARY OF THE INVENTION

Therefore, it is an object of the present invention to provide a liquid random copolymer of ethylene and alpha-olefin whose molecular weight has narrow distribution and superior uniformity.

It is another object of the present invention to provide a liquid random copolymer of ethylene and alpha-olefin having high viscosity index at low temperature as well as excellent heat and oxidation stability and shear stability so that it is useful for synthetic lubricating oils.

It is still another object of the present invention to provide a method for preparing a liquid random copolymer of ethylene and alpha-olefin with high polymerization activity.

In order to achieve these objects, the present invention provides a method for preparing a liquid random copolymer of ethylene and alpha-olefin, comprising a step of: carrying out solution polymerization of ethylene and alpha-olefin having 3 to 20 carbon atoms, under a catalyst system containing (A) a bridged metallocene compound represented by following Formula 1 and (B) at least one compound selected from a group consisting of (i) organoaluminum oxy-compound, and (ii) compound which reacts with the bridged metallocene compound to form ion pair.

[Formula 1]

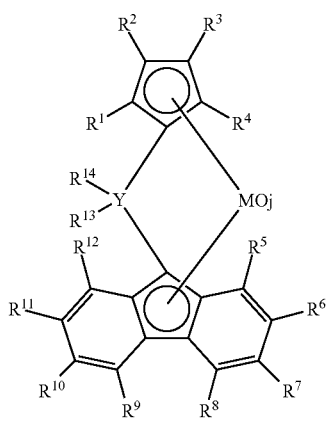

In Formula 1, $R^1$, $R^2$, $R^3$, $R^4$, $R^5$, $R^8$, $R^9$ and $R^{12}$ are respectively and independently hydrogen atom, hydrocarbon group or silicon-containing hydrocarbon group, and adjoining groups are connected to form a ring structure, $R^6$ and $R^{11}$, being the same, are hydrogen atom, hydrocarbon group or silicon-containing hydrocarbon group, $R^7$ and $R^{10}$, being the same, are hydrogen atom, hydrocarbon group or silicon-containing hydrocarbon group, $R^6$ and $R^7$ are connected to hydrocarbon having 2 to 3 carbon atoms to form a ring structure, $R^{11}$ and $R^{10}$ are connected to hydrocarbon having 2 to 3 carbon atoms to form a ring structure, $R^6$, $R^7$, $R^{10}$ and $R^{11}$ are not hydrogen atom at the same time; Y is carbon atom or silicon atom; $R^{13}$ and $R^{14}$ are independently aryl group; M is Ti, Zr or Hf; Q is independently halogen, hydrocarbon group, anionic ligands or a neutral ligand which can be coordinated to a lone pair of electrons; j is an integer of 1~4.

Also, the present invention provides a liquid random copolymer of ethylene and alpha-olefin (1) which comprises 60 to 40 mol % of ethylene units and 40 to 60 mol % of alpha-olefin unit having 3 to 20 carbon atoms, (2) whose number average molecular weight (Mn) measured by Gel Permeation Chromatography (GPC) is 500 to 10,000, a molecular weight distribution (Mw/Mn, Mw is the weight average molecular weight) being 3 or less, (3) whose Kinematic Viscosity at 100° C. is 30 to 5,000, (4) whose pour point is 30 to −45° C., (5) whose Bromine Number is 0.1 or less.

The liquid random copolymer of ethylene and alpha-olefin according to the present invention has high viscosity index at low temperature as well as narrow molecular weight distribution, excellent uniformity, excellent heat and oxidation stability and shear stability so that it is useful for synthetic lubricating oils. Further, in the polymerization method according to the present invention, a catalyst system containing a specific metallocene compound and at least one compound selected from a group consisting of (i) organoaluminum oxy-compound, and (ii) compound which reacts with the specific metallocene compound to form ion pair. Therefore, the catalytic activity is high and the sludge generated is small, and in addition, a liquid random copolymer of ethylene and alpha-olefin can be prepared with high polymerization activity which cannot be conventionally obtained.

DETAILED DESCRIPTION OF THE INVENTION

A more complete appreciation of the invention, and many of the attendant advantages thereof, will be better appreciated by reference to the following detailed description.

The polymerization method according to the present invention uses a single site catalyst system so as to distribute alpha-olefin unit in copolymer chains. The method for preparing liquid random copolymer of ethylene and alpha-olefin comprises a step of carrying out solution polymerization of ethylene and alpha-olefin having 3 to 20 carbon atoms, under a catalyst system containing (A) a bridged metallocene compound represented by following Formula 1 and (B) at least one compound selected from a group consisting of (i) organoaluminum oxy-compound, and (ii) compound which reacts with the bridged metallocene compound to form ion pair.

[Formula 1]

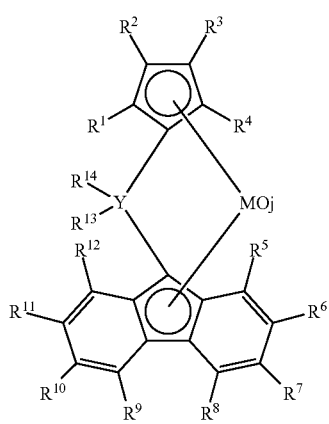

In Formula 1, $R^1$, $R^2$, $R^3$, $R^4$, $R^5$, $R^8$, $R^9$ and $R^{12}$ are respectively and independently hydrogen atom, hydrocarbon group or silicon-containing hydrocarbon group, and adjoining groups are connected to form a ring structure, $R^6$ and $R^{11}$, being the same, are hydrogen atom, hydrocarbon group or silicon-containing hydrocarbon group, $R^7$ and $R^{10}$, being the same, are hydrogen atom, hydrocarbon group or silicon-containing hydrocarbon group, if necessary $R^6$ and $R^7$ are connected to hydrocarbon having 2 to 3 carbon atoms to form a ring structure, $R^{11}$ and $R^{10}$ are connected to hydrocarbon having 2 to 3 carbon atoms to form a ring structure, and $R^6$, $R^7$, $R^{10}$ and $R^{11}$ are not hydrogen atom at the same time; Y is carbon atom or silicon atom; $R^{13}$ and $R^{14}$ are independently aryl group; M is Ti, Zr or Hf, preferably Zr; Q is independently halogen, hydrocarbon group, anionic ligands or a neutral ligand which can be coordinated to a lone pair of electrons; j is an integer of 1~4. Here, the hydrocarbon group has 1 to 20 carbon atoms, preferably 1 to 15 atoms, more preferably 4 to 10 carbon atoms, and means for example alkyl group, aryl group etc. and the aryl group has 4 to 20 carbon atoms, preferably 6 to 15 carbon atoms. Examples of the silicon-containing hydrocarbon group is alkyl or aryl group having 3 to 20 carbon atoms which contains 1 to 4 silicon atoms and in detail includes trimethylsilyl group, tert-butyldimethylsilyl group, triphenylsilyl group etc.

In the bridged metallocene compound represented by Formula cyclopentadienyl group may be substituted or unsubstituted. In the bridged metallocene compound represented by Formula 1, (i) it is preferable that at least one among substituents ($R^1$, $R^2$, $R^3$ and $R^4$) bonded to cyclopentadienyl group is hydrocarbon group, (ii) it is more preferable that at least one among substituents ($R^1$, $R^2$, $R^3$ and $R^4$) is hydrocarbon group having 4 or more carbon atoms, (iii) it is most preferable that substituents ($R^2$ or $R^3$) bonded to 3-position of the cyclopentadienyl group is hydrocarbon group having 4 or more carbon atoms (for example n-butyl group). In case where at least two among $R^1$, $R^2$, $R^3$ and $R^4$ are substituents (that is, being not hydrogen atom), the above-mentioned substituents may be the same or be different, and it is preferable that at least one substituent is hydrocarbon group having 4 or more carbon atoms. In the metallocene compound represented by Formula 1, $R^6$ and $R^{11}$ bonded to fluorenyl group are the same, $R^7$ and $R^{10}$ are the same, but none of $R^6$, $R^7$, $R^{10}$ and $R^{11}$ is hydrogen atom. In high-temperature solution polymerization of poly-alpha-olefin, preferably neither $R^6$ nor $R^{11}$ is hydrogen atom, more preferably none of $R^6$, $R^7$, $R^{10}$ and $R^{11}$ is hydrogen atom, for improving the polymerization activity. For example, $R^6$ and $R^{11}$ bonded to 2-position and 7-position of the fluorenyl group are the same hydrocarbon group having 1 to 20 carbon atoms, preferably all tert-butyl group, and $R^7$ and $R^{10}$ are the same hydrocarbon group having 1 to 20 carbon atoms, preferably all tert-butyl group.

Main chain part (bonding part, Y) connecting the cyclopentadienyl group and the fluorenyl group is a cross-linking section of two covalent bonds comprising one carbon atom or silicon atom, as a structural bridge section imparting steric rigidity to the bridged metallocene compound represented by Formula 1. Cross-linking atom (Y) in the cross-linking section has two aryl groups ($R^{13}$ and $R^{14}$) which may be the same or different. Therefore, the cyclopentadienyl group and the fluorenyl group are bonded by the covalent band cross-linking section containing aryl group. Examples of the aryl group include phenyl group, naphthyl group, anthracenyl group, and substituted aryl group which is formed by substituting one or more aromatic hydrogen (sp2-type hydrogen) of phenyl group, naphthyl group or anthracenyl group with substituents. Examples of substituents substituted in the aryl group include hydrocarbon group having 1 to 20 carbon atoms, silicon-containing hydrocarbon group having 1 to 20 carbon atoms, halogen atom etc, preferably phenyl group. In the bridged metallocene compound represented by Formula 1, preferably $R^{13}$ and $R^{14}$ are the same in view of easy manufacturing.

In the bridged metallocene compound represented by Formula 1, Q is preferably halogen atoms or hydrocarbon group having 1 to 10 carbon atoms. The halogen atom includes fluorine, chlorine, bromine or iodine and, the hydrocarbon group having 1 to 10 carbon atoms includes methyl, ethyl, n-propyle, isopropyle, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexyl methyl, cyclohexyl, 1-methyl-1-cyclohexyl etc. Further, when j is an integer of 2 or more, Q may be same or different.

As the organoaluminum oxy-compound, used in the catalyst system according to the present invention, conventional aluminoxane can be used. For example, linear or ring type aluminoxane represented by following Formulas 2 to 5 can be used. Little amount of organic aluminum compound may be contained in the organoaluminum oxy-compound.

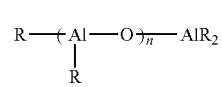

[Formula 2]

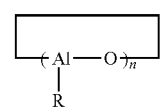

[Formula 3]

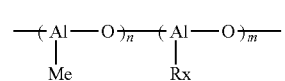

[Formula 4]

In Formulas 2 to 4, R is independently hydrocarbon group having 1 to 10 carbon atoms, Rx is independently hydrocarbon group having 2 to 20 carbon atoms, m and n are independently integer of 2 or more, preferably 3 or more, more preferably 10 to 70, most preferably 10 to 50.

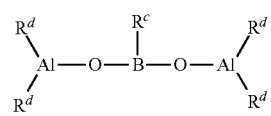

[Formula 5]

In Formula 5, Rc is hydrocarbon group having 1 to 10 carbon atoms, $R^d$ is independently hydrogen atom, halogen atom or hydrocarbon group having 1 to 10 carbon atoms.

In Formula 2 or Formula 3, R is methyl group (Me) of the organoaluminum oxy-compound, which is conventionally called as 'methylaluminoxane'. The methylaluminoxane is easily available and has high polymerization activity so that it is commonly used as an activator in the polyolefin polymerization. However, the methylaluminoxane is difficult to dissolve in a saturated hydrocarbon, thus it has been used as a solution of aromatic hydrocarbon such as toluene or benzene which is environmentally undesirable. Therefore, in recent years, flexible body of methylaluminoxane represented by Formula 4, as aluminoxane dissolved in the saturated hydrocarbon has been developed and used. The modified methylaluminoxane represented by Formula 4 is prepared by using trimethyl aluminum and alkyl aluminum other than trimethyl aluminum as shown in U.S. Pat. No. 4,960,878, U.S. Pat. No. 5,041,584, and for example, is prepared by using trimethyl aluminum and triisobutyl aluminum. The auminoxane in which Rx is isobutyl group is commercially available in the trade name of MMAO, TMAO in the form of saturated hydrocarbon solution. (See: Tosoh Finechem Corporation, 「Tosoh Research & Technology Review」 Vol 47, 55 (2003)).

As (ii) the compound which reacts with the bridged metallocene compound to form ion pair (hereinafter, if needed, referred to as "ionic compound") which is contained in the present catalyst system, can be used lewis acid, ionic compounds, borane compounds, borane compounds and carborane compounds, which are described in Korean Patent No. 10-551147, Japanese Unexamined Publication H01-501950, Japanese Unexamined Publication H3-179005, Japanese Unexamined Publication H3-179006, Japanese Unexamined Publication H3-207703, Japanese Unexamined Publication H3-207704, U.S. Pat. No. 5,321,106 and so on. If needed, heteropoly compounds, and isopoly compound etc. can be used, and the ionic compound disclosed in Japanese Unexamined Publication 2004-51676 can be used. The ionic compound may be used alone or by mixing two or more. In detail, examples of the lewis acid include the compound represented by $BR_3$ (R is fluoride, substituted or unsubstituted alkyl group having 1 to 20 carbon atoms (methyl group), substituted or unsubstituted aryl group having 6 to 20 carbon atoms (phenyl group) etc.), and for example trifluoro boron, triphenyl boron, tris(4-fluorophenyl) boron, tris(3,5-difluorophenyl) boron, tris(4-fluorophenyl) boron, tris(pentafluorophenyl) boron tris(p-tolyl) boron. When the ionic compound is used, its use amount and sludge amount produced are relatively small in comparison with the organoaluminum oxy-compound, so that it is economically advantageous. In the present invention, it is preferable that the compound represented by following Formula 6 is used as the ionic compound.

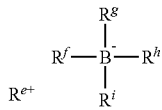

[Formula 6]

In Formula 6, $R^{e+}$ is H+, carbenium cation, oxonium cation, ammonium cation, phosphonium cation, cycloheptyltrienyl cation, ferroceniun cation having transition metal, and $R^f$ to $R^i$ each is independently an organic group, preferably hydrocarbon group having 1 to 20 carbon atoms, more preferably an aryl group, for example, penta-fluorophenyl group. Examples of the carbenium cation include dimethylanilinium, tris(methylphenyl) carbenium cation, tris(dimethylphenyl) carbenium cation, etc.

The catalyst system used in the present invention further includes (C) organoaluminum compound when it is needed. The organoaluminum compound plays a role of activating the bridged metallocene compound, the organoaluminum oxy-compound, the ionic compound, etc. As the organoaluminum compound, preferably organoaluminum represented by following Formula 7, and alkyl complex compounds of Group 1 metal and aluminum represented by following Formula 8 can be used.

[Formula 7]

In Formula 7, $R^a$ and $R^b$ each is independently hydrocarbon group having 1 to 15 carbon atoms, preferably 1 to 4 carbon atoms, and X is a halogen atom, m is an integer of $0<m\leq3$, n is an integer of $0\leq n<3$, p is an integer of $0<p\leq3$, q is an integer of $0\leq q<3$, and m+n+p+q=3.

[Formula 8]

In Formula 8, $M^2$ represents Li, Na or K, Ra is hydrocarbon group having 1 to 15 carbon atoms, preferably 1 to 4 carbon atoms.

The examples of the organoaluminum compound represented by Formula 7 include trimethyl aluminum, triisobutyl aluminum etc, which are easily available. The examples of the alkyl complex compounds of Group 1 metal and aluminum represented by following Formula 8 include LiAl$(C_2H_5)_4$, LiAl$(C_7H_{15})_4$ etc. Compounds similar to the compounds represented by formula 7 can be used. For example, like $(C_2H_5)_2AlN(C_2H_5)Al(C_2H_5)_2$, an organoaluminum compound to which at least 2 aluminum compounds are bonded through nitrogen atoms, can be used.

In the method for preparing liquid random copolymer of ethylene and alpha-olefin according to the present invention, the amount of (A) bridged metallocene compound represented by following Formula 1 is preferably 5 to 50 weight % with respect to total catalyst composition. And, preferably the amount of (B) (i) organoaluminum oxy-compound is 50 to 500 equivalent weights with respect to the molar number of used bridged metallocene compound, the amount of (B) (ii) the compound which reacts with the bridged metallocene compound to form ion pair is 1 to 5 equivalent weights with respect to the molar number of used bridged metallocene compound, and the amount of (C) organoaluminum compound is 5 to 100 equivalent weight with the molar number of used bridged metallocene compound. Here, when the amount of (A) bridged metallocene compound is too little, the polymerization reaction cannot be initiated so that the copolymerization is insufficiently proceed. While when the amount of (A) bridged metallocene compound is too much, it is economically disadvantageous without special interests, and homogeneous (pseudo random) chain-structure composition cannot be produced because of reactivity difference between ethylene and alpha-olefin resulted from high polymerization heat, and excess metal component may reduce transparency of the copolymer. When the amount of (i) organoaluminum oxy-compound and/or (ii) the compound which reacts with the bridged metallocene compound to form ion pair is too little, the reactivity is reduced to lower the product yield, and when the amount thereof is too much, it is economically disadvantageous by price rising of the promoter, without special benefits. When the amount of (c) organoaluminum compound is too little, the reactivity is reduced to lower the product yield, and when the amount thereof is too much, it is economically unfavorable due to increased price and aluminum by-product sludge may be formed and it is difficult to separate the sludge.

The catalyst system used in the present invention may has following [1] to [4] for example.

[1] (A) bridged metallocene compound represented by Formula 1, and (B) (i) organoaluminum oxy-compound

[2] (A) bridged metallocene compound represented by Formula 1, (B) (i) organoaluminum oxy-compound and (C) organoaluminum compound

[3] (A) bridged metallocene compound represented by Formula 1, (B) (ii) the compound which reacts with the bridged metallocene compound to form ion pair, and (C) organoaluminum compound

[4] (A) bridged metallocene compound represented by Formula 1, and (B) (i) organoaluminum oxy-compound and (ii) the compound which reacts with the bridged metallocene compound to form ion pair (A) bridged metallocene compound represented by Formula 1, (B) (i) organoaluminum oxy-compound, (ii) the compound which reacts with the bridged metallocene compound to form ion pair and/or (C) organoaluminum compound may be introduced in any order, with respect to starting raw material monomer (a mixture of ethylene and alpha-olefin having 3 to 20 carbon atoms). For example, elements (A), (B) and/or (C) are introduced alone or in any order, to a polymerization reactor with which raw material monomer is filled. Alternatively, if required, at least two elements among (A), (B) and/or (C) are mixed and then the mixed catalyst composition is introduced to the polymerization reactor with which raw material monomer is filled.

The liquid random copolymer of ethylene and alpha-olefin according to the present invention is prepared by a solution polymerization of ethylene and alpha-olefin having 3 to 20 carbon atoms under the catalyst system. As the alpha-olefin having 3 to 20 carbon atoms, one or more among a linear alpha-olefin such as propylene, 1-butene, 1-penetene, 1-hexene etc., branch alpha-olefin such as isobutylene, 3-methyl-1butene, 4-methyl-1-penetene etc. and mixture thereof can be used. Preferably, one or more of alpha-olefin having 3 to 6 carbon atoms can be used, and more preferably, propylene can be used. The solution polymerization can be carried out by using an inert solvent such as propane, butane or hexane etc. or olefin monomer itself as a medium. In the copolymerization of ethylene and alpha-olefin of the present invention, the temperature for the copolymerization is conventionally 80 to 150° C., preferably 90 to 120° C., and the pressure for the copolymerization is atmospheric pressure to 500 kg/cm², preferably atmospheric pressure to 50 kg/cm², which can vary in accordance with reacting materials, reacting conditions, etc. The polymerization can be carried out in batch-type, semi continuous-type or continuous-type, and preferably carried out in continuous-type. Here, when the polymerization temperature is too low, it is worried that the high molecular weight copolymer can be formed, and when the polymerization temperature is too high, it is worried that the catalyst activity can be reduced owing to the thermal stability.

The liquid random copolymer according to the present invention which is formed by copolymerization of ethylene and alpha-olefin having 3 to 20 carbon atoms, is in liquid phase at room temperature and it has a structure of alpha-olefin unit being uniformly distributed in the copolymer chain. The copolymer of the present invention comprises 60 to 40 mol %, preferably 45 to 55 mol % of ethylene units derived from ethylene and 40 to 60 mol %, preferably 45 to 55 mol % of alpha-olefin unit having 3 to 20 carbon atoms, derived from alpha-olefin. When the amount of ethylene unit is less than 40 mol %, the amount of propylene is increased so that the liquid copolymer cannot be formed. When the amount of ethylene unit is more than 60 mol %, the amount of ethylene is excessively increased so that it is difficult to form the liquid copolymer or the copolymer produced is not suitable for synthetic lubricating oils.

The number average molecular weight (Mn) of the copolymer according to the present invention is 500 to 10,000, preferably 800 to 6,000, the molecular weight distribution (Mw/Mn, Mw is weight average molecular weight) is 3 or less, preferably 2 or less. The Mn is too small, volatility of the copolymer is excessively increased so that the copolymer produced is not suitable for synthetic lubricating oils because of evaporation loss. The Mn is too large, kinematic viscosity of the copolymer is increased to be waxy or solid copolymer may be formed to increase the low-temperature viscosity, accordingly it is worried that the copolymer produced is not suitable for synthetic lubricating oils. While, the molecular weight distribution (Mw/Mn) is too large, there is a possibility to reduce shear stability of the copolymer. The number average molecular weight (Mn) and the molecular weight distribution (Mw/Mn) are measured by gel permeation chromatography (GPC).

The copolymer according to the present invention has the kinematic viscosity at 100° C. of 30 to 5,000, preferably 50 to 3,000, pour point of 30 to −45° C., preferably 20 to −35° C., Bromine Number of 0.1 or less. Here, when the kinematic viscosity is too small, the present copolymer is not applicable to lubricating products having a high viscosity such as gear oils, turbin oils etc, and when the kinematic viscosity is too large, there is almost no flowability of the coplymer, therefore the copolymer is not suitable for the lubricating oils. When the pour point is too low (−45° C. or less), the polymerization reaction is not easy, and when the pour point is too high, flowability of the coplymer at low temperature is excessively lowered. When the Bromine Number is more than 0.1, an unsaturated double bond which remains in the copolymer reduces the chemical stability of the copolymer and elevates the reactivity thereof, therefore the debris tends to be generated, and yellowing of lubricating oils may be accompanied. In addition, the thermal stability, oxidation stability, resistance to corrosion of the copolymer are reduced, and the mechanical and physical stability thereof is deteriorated. Therefore, long-term use of the copolymer reduces the viscosity thereof and the operation of the copolymer as the lubricating oils is not carried out, reducing the life span of the copolymer as the lubricating oils.

In the liquid copolymer of ethylene and alpha-olefin according to the present invention, the monomers thereof are evenly distributed over the entire length of the copolymer molecule, composition and molecular weight distributions are narrow the uniformity is excellent and the little double bond is distributed, therefore, the liquid copolymer is specifically useful for the synthetic lubricating oils which requires high viscosity index, low-temperature viscosity, shear and thermal stability, durability etc.

MODE FOR THE INVENTION

Following Examples and Comparative Examples are for a better understanding of the present invention, by which the present invention is not limited. In the specification, the measurement of respective physical properties is made as follows.

1. Measurement of Ethylene Amount and Amount of Unsaturated Group at Molecular One Ends]

A solvent of tetrachloroethane-d4 (Acros, 99.8 atom % D) and 10 wt % of the ethylene and alpha-olefin copolymer were introduced into a sample tube and 1H-NMR and 13C-NMR spectrum were obtained by applying the nuclear magnetic resonance (Avance III 500 MHz, Bruker Biospin) in the condition of 45 pulse width and a pulse repetition time 10 seconds. Then ethylene amount and the amount of unsaturated group at molecular one ends of the copolymer were measured. 1H-NMR was measured at room temperature and 13C-NMR was measured at 50° C.

2. Measurement of Number Average Molecular Weight and Molecular Weight Distribution The number average molecular weight and the molecular weight distribution were measured by using GPC (VE2001, Viscotek product). In GPC measurement, PLgel 5 μm Mixed-D column whose inner diameter is 7.5 mm and length is 300 mm was used, the measuring temperature was 35° C., THF (tetrahydrofuran, Burdick and Jackson, HPLC grade) was used as a solvent (in mobile phase). In mobile phase, the sample was supplied at rate of 1 ml/min, sample concentration was 9.26 wt %, the sample injection amount was about 100 μl. The differential refractometer was used as a detecting instrument, and peaks detected was separated by using a data processor of OmniSEC 4.6 (data processor manufactured by Viscotek).

3. Measurement of Kinematic Viscosity/Viscosity Index

By using Lauda PV15 (Japan), the kinematic viscosity of the copolymer was measured at 100° C. and 40° C. according to ASTM D 445, and the viscosity Index was measured according to ASTM D2270.

4. Pour point: By using MPC 102 L (oil temperature: −40° C.) of Tanaka scientific limited, Japan, low-temperature pour point was measured in accordance with ASTM D 6749.

5. Flash point, Bromine index and appearance: The flash point was measured in accordance with ASTM D 92, in the manner of Cleveland Open Cup, the Bromine index was measured in accordance with ASTM D1559. The appearance of the copolymer was observed with naked eyes and it is determined as "good" when the copolymer is not turbid.

Example 1

Preparation of the Ethylene and Alpha-Olefin Copolymer

A. Preparation of catalyst solution: To a glass flask filled with nitrogen gas, 0.15 mmol of diphenylmethylene{$\eta^5$-(3-n-butylcyclopentadienyl)}{$\eta^5$-(2,7-di-tert-butylfluorenyl)}zirconium dichloride, 0.2 mmol of dimethlylanilium (tetrakis pentafluorophenyl) borate 0.2 mmol, 8 mmol of triisobutyl aluminum and toluene were introduced and mixed, to prepare the catalyst solution of 120 ml.

B. Polymerization: 375 ml of hexane was injected to stainless autoclave (area: 1.1 L) filled with nitrogen gas, a temperature of reaction system was heated to 70° C., and then 15 ml of catalyst solution prepared at Step A was added. Next, 260 g/hr of ethylene, 12.40 ml/min of liquid propylene, 1.95 g/hr of hydrogen, 30 ml/min of hexane, and 0.25 ml/min of catalyst solution were continuously injected, and initiated the copolymerization reaction with stirring at 1630 rpm. Thereafter, the catalyst injection amount was reduced, finally 0.07 ml/min of catalyst solution was continuously injected, and the copolymerization was carried out with maintaining the temperature of 100° C. and the pressure of 16 Bar. The copolymer solution polymerized was continuously discharged through a back pressure regulator, and was mixed with 1M sodium hydroxide solution to be inactivated.

C. Process after the polymerization: The sodium hydroxide solution was removed from the mixture of the copolymer solution and the sodium hydroxide solution, and the impurities in the copolymer solution was removed by extraction using a distilled water. Next, the copolymer solution was concentrated for 30 minutes at 100° C. and reduced pressure, then dried for 30 minutes at 230° C. and reduced pressure, to obtain 435 g of ethylene and propylene copolymer. The polymerization condition for the copolymer was shown in Table 1, the physical features of obtained copolymer were analyzed, and the result thereof were listed in Table 3 and 4.

Example 2

Preparation of the Ethylene and Alpha-Olefin Copolymer

The procedures were performed in the same manner as described in Example 1, excepting that supply rate of hydrogen was changed to 0.65 g/hr, to obtain 460 g of the ethylene and alpha-olefin copolymer. The polymerization condition for the copolymer was shown in Table 1, the physical features of obtained copolymer were analyzed, and the result thereof were listed in Table 3 and 4.

Example 3

Preparation of the Ethylene and Alpha-Olefin Copolymer

The procedures were performed in the same manner as described in Example 1, excepting that supply rate of hydrogen gas was changed to 0.35 g/hr, to obtain 470 g of the ethylene and alpha-olefin copolymer. The polymerization condition for the copolymer was shown in Table 1, the physical features of obtained copolymer were analyzed, and the result thereof were listed in Table 3 and 4.

Example 4

Preparation of the Ethylene and Alpha-Olefin Copolymer

A. Preparation of catalyst solution: To a glass flask filled with nitrogen gas, 0.15 mmol of diphenylmethylene{$\eta^5$-(3-n-butyl-cyclopentadienyl)}{$\eta^5$-(2,7-di-tert-butylfluorenyl) Zirconium dichloride, MAO (methylaluminoxane, Albemarle corporation, 10% toluene solution) were introduced and mixed, to prepare the catalyst solution of 120 ml.

B. Polymerization: 375 ml of hexane was injected to stainless autoclave (area: 1.1 l) filled with nitrogen gas, a temperature of reaction system was heated to 70° C., and then 15 ml of catalyst solution prepared at Step A was added. Next, 260 g/hr of ethylene, 12.40 ml/min of liquid propylene, 1.95 g/hr of hydrogen gas, 30 ml/min of hexane, and 0.25 ml/min of catalyst solution were continuously injected, and initiated the copolymerization reaction with stirring at 1630 rpm. Thereafter, the catalyst injection amount was reduced, finally 0.07 ml/min of catalyst solution was continuously injected, and the copolymerization was carried out with maintaining the temperature of 100° C. and the pressure of 16 Bar. The copolymer solution polymerized was continuously discharged through a back pressure regulator, and was mixed with 1M sodium hydroxide solution to be inactivated.

C. Process after the polymerization: The sodium hydroxide solution was removed from the mixture of the copolymer solution and the sodium hydroxide solution, and the impurities in the copolymer solution was removed by extraction using a distilled water. Next, the copolymer solution was concentrated for 30 minutes at 100° C. and reduced pressure, then dried for 30 minutes at 230° C. and reduced pressure to obtain 415 g of ethylene and propylene copolymer. The polymerization condition for the copolymer was shown in Table 1, the physical features of obtained copolymer were analyzed, and the result thereof were listed in Table 3 and 4.

Example 5

Preparation of the Ethylene and Alpha-Olefin Copolymer

The procedures were performed in the same manner as described in Comparative Example 1, excepting that supply rate of hydrogen was changed to 0.65 g/hr, to obtain 440 g of the ethylene and alpha-olefin copolymer. The polymerization condition for the copolymer was shown in Table 2, the physical features of obtained copolymer were analyzed, and the result thereof were listed in Table 3 and 4.

Example 6

Preparation of the Ethylene and Alpha-Olefin Copolymer

The procedures were performed in the same manner as described in Comparative Example 1, excepting that supply rate of hydrogen was changed to 0.35 g/hr, to obtain 450 g of the ethylene and alpha-olefin copolymer. The polymerization condition for the copolymer was shown in Table 2, the physical features of obtained copolymer were analyzed, and the result thereof were listed in Table 3 and 4.

Comparative Example 1

Preparation of Ethylene and Alpha-Olefin Copolymer

A. Preparation of catalyst solution: To a glass flask filled with nitrogen gas, 0.15 mmol of dimethylsilylbis(indenyl)zirconium dichloride, MAO (methylaluminoxane, Albemarle corporation, 10% toluene solution) were introduced and mixed, to prepare the catalyst solution of 120 ml.

B. Polymerization: 375 ml of hexane was injected to stainless autoclave (area: 1.1 l) filled with nitrogen gas, a temperature of reaction system was heated to 70° C., and then 15 ml of catalyst solution prepared at Step A was added. Next, 260 g/hr of ethylene, 12.40 ml/min of liquid propylene, 1.95 g/hr of hydrogen, 30 ml/min of hexane, and 0.25 ml/min of catalyst solution were continuously injected, and initiated the copolymerization reaction with stirring at 1630 rpm. Thereafter, the catalyst injection amount was reduced, finally 0.07 ml/min of catalyst solution was continuously injected, and the copolymerization was carried out with maintaining the temperature of 100° C. and the pressure of 16 Bar. The copolymer solution polymerized was continuously discharged through a back pressure regulator, and was mixed with 1M sodium hydroxide solution to be inactivated.

C. Process after the polymerization: The sodium hydroxide solution was removed from the mixture of the copolymer solution and the sodium hydroxide solution, and the impurities in the copolymer solution was removed by extraction using a distilled water. Next, the copolymer solution was concentrated for 30 minutes at 100° C. and reduced pressure, then dried for 30 minutes at 230° C. and reduced pressure to obtain 100 g of ethylene and propylene copolymer. The polymerization condition for the copolymer was shown in Table 2, the physical features of obtained copolymer were analyzed, and the result thereof were listed in Table 3 and 4.

Comparative Example 2

Preparation of the Ethylene and Alpha-Olefin Copolymer

The procedures were performed in the same manner as described in Comparative Example 4, excepting that supply rate of hydrogen was changed to 0.65 g/hr, to obtain 115 g of the ethylene and alpha-olefin copolymer. The polymerization condition for the copolymer was shown in Table 2, the physical features of obtained copolymer were analyzed, and the result thereof were listed in Table 3 and 4.

Comparative Example 3

Preparation of the Ethylene and Alpha-Olefin Copolymer

The procedures were performed in the same manner as described in Comparative Example 4, excepting that supply rate of hydrogen was changed to 0.35 g/hr, to obtain 145 g of the ethylene and alpha-olefin copolymer. The polymerization condition for the copolymer was shown in Table 2, the physical features of obtained copolymer were analyzed, and the result thereof were listed in Table 3 and 4.

TABLE 1

| | | Example 1 | Example 2 | Example 3 | Example 4 |
|---|---|---|---|---|---|
| | ethylene, g/hr | 260 | 260 | 260 | 260 |
| | propylene, g/hr | 457 | 457 | 457 | 457 |
| | hydrogen, g/hr | 1.95 | 0.65 | 0.35 | 1.95 |
| | hexane, g/hr | 30 | 30 | 30 | 30 |
| catalyst | dimethylsilylbis(indenyl)zirconium dichloride (mg/hr) | — | — | — | — |
| | diphenylmethylene(3-n-butyl-cyclopentadienyl)(2,7-di-tert-butylfluorenyl)zirconiumdichloride) (mg/hr) | 3.8 | 3.8 | 3.8 | 3.8 |
| promoter | methylaluminoxane (ml/hr) | — | — | — | 4.2 |
| | dimethylanilinium tetra(pentafluorophenyl)boron (g/hr) | 5.6 | 5.6 | 5.6 | — |
| | temperature (° C.) | 100 | 100 | 100 | 100 |
| | pressure (psig) | 16 | 16 | 16 | 16 |

TABLE 2

|  | Example 5 | Example 6 | Comparative Example 1 | Comparative Example 2 | Comparative Example 3 |
|---|---|---|---|---|---|
| ethylene, g/h | 260 | 260 | 260 | 260 | 260 |
| propylene, g/hr | 457 | 457 | 457 | 457 | 457 |
| hydrogen, g/h | 0.65 | 0.35 | 1.95 | 0.65 | 0.35 |
| hexane, g/hr | 30 | 30 | 30 | 30 | 30 |
| catalyst dimethylsilylbis(indenyl) zirconiumdichloride (mg/hr) | — | — | 2.3 | 2.3 | 2.3 |
| diphenylmethylene(3-n-butyl-cyclopenta-dienyl)(2,7-di-tert-butylfluorenyl) zirconium-dichloride) (mg/hr) | 3.8 | 3.8 | — | — | — |
| promoter methylalummoxane (ml/hr) | 4.2 | 4.2 | 4.2 | 4.2 | 4.2 |
| dimethylaniliniumtetra (pentafluorophenyl)boron (g/hr) | — | — | — | — | — |
| temperature (° C.) | 100 | 100 | 100 | 100 | 100 |
| pressure (psig) | 16 | 16 | 16 | 16 | 16 |

TABLE 3

|  | Ethylene (C2) amount (mol %) | Mn | Mw/Mn | Kinematic viscosity at 100° C. (cSt) | Kinematic viscosity at 40° C. (cSt) |
|---|---|---|---|---|---|
| Example 1 | 45.08 | 2080 | 1.82 | 140 | 1,900 |
| Example 2 | 45.07 | 3736 | 1.81 | 700 | 7,300 |
| Example 3 | 45.17 | 5385 | 1.88 | 2300 | 44,100 |
| Example 4 | 45.10 | 2135 | 1.82 | 145 | 2000 |
| Example 5 | 45.01 | 3694 | 1.83 | 750 | 8100 |
| Example 6 | 45.89 | 5985 | 1.89 | 2450 | 49500 |
| Comparative Example 1 | 45.05 | 2184 | 1.84 | 150 | 2200 |
| Comparative Example 2 | 45.77 | 3855 | 1.85 | 900 | 10500 |
| Comparative Example 3 | 45.97 | 5334 | 1.91 | 2500 | 50900 |

TABLE 4

|  | Viscosity Index | Pour point (° C.) | Flash Point (° C.) | Bromine Number | Appearance | Sludge |
|---|---|---|---|---|---|---|
| Example 1 | 177 | −30 | 247 | <0.1 | Clear | x |
| Example 2 | 300 | −15 | 280 | <0.1 | Clear | x |
| Example 3 | 305 | 0.0 | 290 | <0.1 | Clear | x |
| Example 4 | 177 | −29.5 | 245 | 0.5 | Haze | ○ |
| Example 5 | 299 | −12.5 | 284 | 0.4 | Haze | ○ |
|  |  |  |  |  | Haze | ○ |
| Example 6 | 304 | 0.0 | 301 | 0.3 | Haze | ○ |
| Comparative Example 1 | 173 | −30.0 | 250 | 8.5 | Haze | ○ |
| Comparative Example 2 | 302 | −10.0 | 285 | 7.1 | Haze | ○ |
| Comparative Example 3 | 304 | 2.0 | 298 | 2.3 | Haze | ○ |

As shown in Table 3 and Table 4, the copolymers prepared in Example 1 to Example 3 have excellent appearance and suppress the sludge formation, comparing with the copolymers prepared in Example 4 to Example 6. Therefore, the copolymer prepared according to a method of the present invention not only has superior physical properties but also does not need additional processes for removing the sludge, thus economically useful. Further, the copolymers prepared in Example 1 to Example 6 have small bromine number, comparing with the copolymers prepared in Comparative Example 1 to Comparative Example 3. When the bromine number is more than 0.1, owing to the unsaturated double bond remaining in the copolymer, the chemical stability of the copolymer is lowered and the reactivity is increased so that the debris tends to be generated and and yellowing of lubricating oils may be accompanied.

In addition, the thermal stability, oxidation stability, resistance to corrosion of the copolymer are reduced, and the mechanical and physical stability thereof is deteriorated. Therefore, long-term use of the copolymer reduces the viscosity thereof and the operation of the copolymer as the lubricating oils is not carried out, reducing the life span of the copolymer as the lubricating oils. In order to compensate for the above, additional hydrogenation processes has been conventionally added, but the present invention, without such additional processes, can prepare the copolymer useful in the lubricating oils having excellent thermal stability, oxidation stability and resistance to corrosion.

What is claimed is:

1. A method for preparing a liquid random copolymer of ethylene and alpha-olefin, comprising a step of:
   carrying out solution polymerization of ethylene and alpha-olefin having 3 to 20 carbon atoms, under a catalyst system containing:
   (A) a bridged metallocene compound represented by following Formula 1, and
   (B) at least one compound selected from a group consisting of (i) an organoaluminum oxy-compound and (ii) a compound which reacts with the bridged metallocene compound to form ion pair,

[Formula 1]

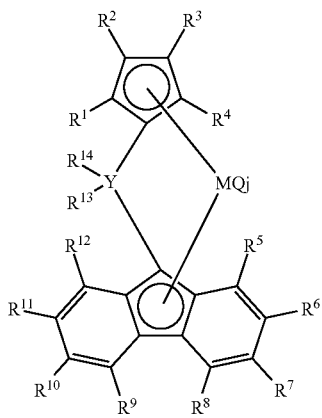

wherein, $R^1$ and $R^4$ are hydrogen atom; $R^2, R^3, R^5, R^8, R^9$ and $R^{12}$ are independently hydrogen atom, hydrocarbon group or silicon-containing hydrocarbon group, and adjacent groups can be connected to form a ring structure at least one of $R^2$ and $R^3$ is hydrocarbon group having 4 or more carbon atoms; $R^6$ and $R^{11}$ are the same as each other and are hydrogen atom, hydrocarbon group or silicon-containing hydrocarbon group $R^7$ and $R^{10}$ are the same as each other and are hydrogen atom, hydrocarbon group or silicon-containing hydrocarbon group; $R^6$ and $R^7$ can be connected to hydrocarbon having 2 to 3 carbon atoms to form a ring structure $R^{11}$ and $R^{10}$ can be connected to hydrocarbon having 2 to 3 carbon atoms to form a ring structure; $R^6$, $R^7$, $R^{10}$ and $R^{11}$ are not hydrogen atom at the same time; Y is carbon atom or silicon atom; $R^{13}$ and $R^{14}$ are independently aryl group; M is Ti, Zr or Hf; Q is independently halogen, hydrocarbon group, anionic ligands or a neutral ligand which can be coordinated to a lone pair of electrons; j is an integer of 1-4; and wherein the liquid random copolymer (1) comprises 40 to 60 mol % of ethylene units and 60 to 40 mol % of alpha-olefin units having 3 to 20 carbon atoms; (2) has a number average molecular weight (Mn) of 500 to 10,000 and a molecular weight distribution (Mw/Mn wherein Mw is weight average molecular weight) of 3 or less measured by gel permeation chromatography (GPC); (3) has a kinematic viscosity at 100° C. of 30 to 5,000; (4) has a pour point of 30 to −45° C., and (5) has a bromine number of 0.1 or less.

2. The method as claimed in claim 1, wherein $R^6$ and $R^{11}$ are same hydrocarbon group having 1 to 20 carbon atoms.

3. The method as claimed in claim 1, wherein $R^2$ or $R^3$ is n-butyl group.

4. The method as claimed in claim 1, wherein $R^6$ and $R^{11}$ are tert-butyl group.

5. The method as claimed in claim 1, wherein the compound which reacts with the bridged metal is a compound represented by following Formula 6,

[Formula 6]

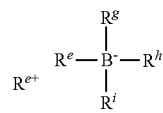

wherein Re+ is $H^+$, carbenium cation, oxonium cation, ammonium cation, phosphonium cation, cycloheptyltrienyl cation, ferroceniun cation having transition metal; and $R^f$ to $R^i$ each is independently a hydrocarbon group having 1 to 20 carbon atoms.

6. The method as claimed in claim 5, wherein the catalyst system further comprises organoaluminum compound selected from the group consisting of trimethyl aluminum and triisobutyl aluminum.

* * * * *